United States Patent [19]
Kwun et al.

[11] Patent Number: 5,821,430
[45] Date of Patent: Oct. 13, 1998

[54] METHOD AND APPARATUS FOR CONDUCTING IN-SITU NONDESTRUCTIVE TENSILE LOAD MEASUREMENTS IN CABLES AND ROPES

[75] Inventors: Hegeon Kwun; Keith Bartels; John J. Hanley, all of San Antonio, Tex.

[73] Assignee: Southwest Research Institute, San Antonio, Tex.

[21] Appl. No.: 810,618

[22] Filed: Feb. 28, 1997

[51] Int. Cl.[6] .................................................. G01L 1/10
[52] U.S. Cl. .......................................... 73/862.41; 73/581
[58] Field of Search ........................... 73/862.39, 862.41, 73/862.44, 862.451, 862.59, 862.541, 862.56, 862.69, 786, 581

[56] References Cited

U.S. PATENT DOCUMENTS

| | | |
|---|---|---|
| 3,115,774 | 12/1963 | Kolb . |
| 4,979,125 | 12/1990 | Kwun et al. . |
| 5,456,113 | 10/1995 | Kwun et al. . |
| 5,457,994 | 10/1995 | Kwun et al. . |
| 5,581,037 | 12/1996 | Kwun et al. . |

OTHER PUBLICATIONS

H. Kwun and K.A. Bartels Feb. 1996. "Experimental observation of elastic–wave dipsersion in bounded solids of various configurations", J. Acoust. Soc. Am 99(2).

Hegeon Kwun, John J. Hanley, and Keith A. Bartels "Recent Developments in Nondestructive Evalution of Steel Strands and Cables Using Magnetostrictive Sensors".

*Primary Examiner*—Ronald L. Biegel
*Attorney, Agent, or Firm*—Kammer & Huff, PLLC

[57] ABSTRACT

An apparatus and method for the non-contact measurement of tensile loading (or tension) in ferromagnetic materials, particularly wire ropes, cables, and strands. The magnetostrictive effect is used to measure wave propagation properties within such materials to determine load forces imposed on the tested material based upon a signature obtained for like materials under like conditions. The apparatus and method contemplate an active measurement application, wherein a transmitting sensor generates an mechanical pulse within a material through the magnetostrictive effect, and a receiving sensor detects reflected mechanical waves within the material by the inverse magnetostrictive effect. Unlike other sensing methods, utilizing the magnetostrictive effect in this way has the advantage of generating and detecting mechanical waves in the tested material without direct physical or acoustical contact. The apparatus and method of the present invention also anticipates the use of a long-term monitoring system that records acquired tensile load measurements for detection of possible structural anomalies and immediate activation of an alarm, or storage and retrieval/analysis at a later time.

15 Claims, 8 Drawing Sheets

METHOD AND APPARATUS FOR CONDUCTING IN-SITU NONDESTRUCTIVE TENSILE LOAD MEASUREMENTS IN CABLES AND ROPES

BACKGROUND OF THE INVENTION

The U.S. Government has a paid-up license in this invention and the right in limited circumstances to require the patent owner to license others on reasonable terms as provided for by the terms of Contract No. DTFH61-95-X-00044 awarded by the Federal Highway Administration.

1. Field of the Invention

The present invention relates generally to nondestructive measurement (NDM) of tensile loading in ferromagnetic ropes, cables, wire strands, and tendons. The present invention relates more specifically to the nondestructive measurement of the level of tensile loading in ferromagnetic ropes, cables, wire strands, and tendons using magnetostrictively induced mechanical waves.

2. Description of the Prior Art

Deterioration (corrosion and/or fracture) and creeping of tendons in prestressed and post-tensioned concrete structures, such as highway concrete bridge girders, is a serious problem. In addition to physical damage in the strands such as corrosion and broken wires, the amount of the prestressing force (or load) remaining in the strands is a very important parameter for evaluating the integrity of the entire structure. A significant loss of the prestressing force would indicate the structure has lost its original load bearing capacity and that there is a risk of failure unless its use is downgraded, or the structure is repaired or replaced. In order to evaluate bridge safety, a means for the in-situ NDM of remaining prestressing load in these tendons is needed.

Measurements of tension (or tensile load) in a suspended rope, cable or strand is also useful in various applications. For example, measurements of tension in suspender ropes in suspension bridges and in stay-cables in cable-stayed-bridges will allow bridge engineers to determine changes in loading patterns due to foundation shift and structural degradation of bridge members and, thus, are useful for evaluating the structural condition of the bridge. Also, measurements of tension in tower guy wires, mooring lines, sling lines, and wire ropes in cranes or mining elevators are useful as a tool to gauge adjustments of tension to prescribed safe limits and to prevent damage or destruction due to over-stressing.

It is known that mechanical forces associated with ultrasonic waves traveling in a ferromagnetic cable change the cable's magnetic induction properties due to the inverse-magnetostrictive effect. Such changes can be detected using a magnetostrictive pick-up coil placed around or on the cable, and used to determine various properties of the cable as follows:

U.S. Pat. No. 3,115,774, issued to Kolb, describes a magnetostrictive drill string logging device that incorporates a vibration sensor and takes advantage of the magnetostrictive properties of a metallic drill string. Unfortunately, the accuracy of the vibration sensor utilized in the Kolb patent greatly limits the efficacy of the patented device for evaluation of drill string condition within a drill hole. While the Kolb patent discloses use of the magnetostrictive principle for general analysis of conditions along a ferromagnetic strand, it does not disclose an apparatus and method that allows measurement of prestress loading found in objects such as ferromagnetic steel cable.

An article published in the book "Ultrasonic Testing," edited by J. Szilard, describes the application of magnetostrictive techniques to wire rope testing for fractured strands and corrosion. No description of an apparatus or method for actual implementation of the concept disclosed is provided. However, the Szilard article does discuss using a magnetostrictively generated spiraling wave to detect cracks within a single rod. Such spiraling waves, however, can only be used over a limited distance. Thus, the technique described does not lend itself to applications which involve long ropes or cables.

U.S. Pat. No. 4,979,125 issued to Kwun, et al. describes a nondestructive means for evaluating wire ropes and cables by using a transverse impulse vibrational wave method, permitting flaw detection by recognizing certain vibrational wave patterns which result from physically striking the test cable. Tension on a test strand or cable can then be calculated by measuring the propagation velocity of the vibrational waves through the test object. The distribution in both amplitude and time of the waves that result allows analysis of tension variation along a normally inaccessible length of cable. This method of analysis, however, is not appropriate for many areas where the vibration of the cable is affected by external components of the bridge structure or other external forces which restrict free movement of the wire strands (e.g. when embedded in concrete).

The advantages of utilizing magnetostrictive sensors as opposed to well known piezoelectric sensors lies in the ability to generate and detect mechanical waves without a direct physical or acoustical contact to the material. It would, therefore, be advantageous to develop an NDM method and apparatus useful for determination of tensile load (or tension) which exists in ferromagnetic wires, ropes, and wire strands. Such a method would ideally support in-situ evaluation, with no requirement for direct access to all points of the material under test.

SUMMARY OF THE INVENTION

The magnetostrictive effect refers to the interaction between physical dimension changes and variations in magnetization as a property of ferromagnetic materials. The effect is widely used to make vibrating elements for sonar transducers and hydrophones. It is also used to excite spiraling waves in steel rod as a means of nondestructive inspection during the manufacturing process. Using the magnetostrictive effect in this way is similar to non-contact generation and detection of ultrasonic waves in non-ferrous materials using electromagnetic acoustic transducers that rely on the Lorentz force.

The magnetostrictive effect is also used in delay line applications, where generation and detection of ultrasonic waves is typically achieved by introducing a sinusoidal or pulsed current into a transmitting coil surrounding a magnetostrictive delay line. As the magnetization within the line changes, the length of the line material itself changes in a direction parallel to the applied field. This abrupt local dimensional change, which is due to the magnetostrictive effect, generates a stress wave within the rod material that travels at the speed of sound from the transmitting coil location toward both ends of the rod. When the stress wave is reflected back from one end of the rod and reaches a receiving coil, it generates a changing magnetic flux in the receiving coil as a result of the inverse magnetostrictive effect. This flux change in turn produces an electric voltage within the receiving coil which is proportional to the magnitude of the stress wave.

The magnetostrictive effect is independent of the direction of the applied magnetic field; an equivalent stress wave is generated during each half cycle of the applied magnetic field, so that the stress wave frequency is twice that of the current applied to the transmitting coil. The frequency of the stress wave can be made to equal that of the applied current by subjecting the rod to a bias magnetic field (e.g. using a permanent magnet or an electromagnet).

The present invention consists of a method and apparatus for measuring the tension in wire or cable strands by using magnetostrictive sensors (MsSs) and a frequency analysis technique. The invention is based on a newly-observed physical phenomenon which affects elastic wave propagation along individual wires comprising a prestressing strand under various applied loads. The inventive method can also be used, with suitable calibration, for measurement of the applied load to steel tendons in post-tensioned concrete structures and steel cables in highway suspension and cable-stayed bridges, as well as to measure loads applied to wire ropes used for slings, guy-wires, or cranes.

Accordingly, the present invention provides: a) an apparatus and method for the nondestructive measurement of tensile loading which exists in ferromagnetic ropes, cables, or wire strands;

b) an apparatus and method for the nondestructive measurement of tensile loading which exists in ferromagnetic ropes, cables, or wire strands, as a means of detecting flaws, fractured wires, and corrosion therein;

c) an apparatus and method for the nondestructive measurement of tensile loading which exists in ferromagnetic ropes, cables, or wire strands, as a means of detecting reduced load bearing capability in structures supported thereby;

d) an apparatus and method for the nondestructive measurement of tensile loading which exists in ferromagnetic ropes, cables, or wire strands which additionally may serve to indicate the presence of flaws, fractures, or corrosive effects within the cable, rope, or strand, including areas that are not normally accessible to direct ultrasonic analysis; and e) an apparatus and method for monitoring tensile loading changes in ropes, cables, wire strands, and other ferromagnetic structures.

One application of the present invention involves encircling a cable for which tensile loading is to be measured with a transmitting coil, and energizing the coil with a time-varying electric current so as to induce and transmit a mechanical wave (by way of the magnetostrictive effect) in individual wires comprising the cable. When this mechanical wave reaches a receiving coil, which likewise encircles the cable at some distance from the transmitting coil, the resulting electric signal is thereafter amplified, digitized, and analyzed in the frequency domain. The "notch" frequency (i.e. that frequency at which there is a pronounced lack of spectral content, amid a band of frequencies which exist in significantly greater magnitude) found by observation of the transformed wave parameters can then be determined, and the applied load can be calculated by using a known relationship between the notch frequency and the load.

While the disclosed invention generally involves the use of two magnetostrictive sensors (i.e. a separate "transmitter" and "receiver"), a single sensor can also be used to effect measurement of tensile loading under certain conditions. In this case, a single magnetostrictive sensor is applied to the ferromagnetic cable (or other ferromagnetic structural component) in close proximity to the cable end, excited as a transmitting element, and then electronically "switched" to act as a magnetostrictive receiving element. The mechanical wave initiated by the sensor/transmitter travels to the cable endpoint, is reflected, and returns for reception by the sensor/receiver, after which the resulting electrical signal is further processed.

The apparatus and method of the present invention can also be applied to monitor progressive changes in the tensile loading of cables, tendons, etc. over time, recording information and transmitting an alarm on the occurrence of a change exceeding a specified level.

The apparatus and method of the present invention can, in addition to being used for measurement of tensile loads in bridge cables, be applied to the inspection of other steel cables and ropes, including, but not limited to: drag lines, ski lifts, mining cables, elevator cables, crane wire ropes, tendons buried in concrete, and other similarly prestressed or stress-loaded ferromagnetic materials.

The geometry of the structures to which the apparatus and method of the present invention can be applied is generally not limited, but the present invention lends itself most effectively to the NDM stress loads within elongated structural elements; i.e. those that can be roughly characterized as linear bodies.

DETAILED DESCRIPTION OF THE PREFERRED EMBODIMENT

Figure 1:
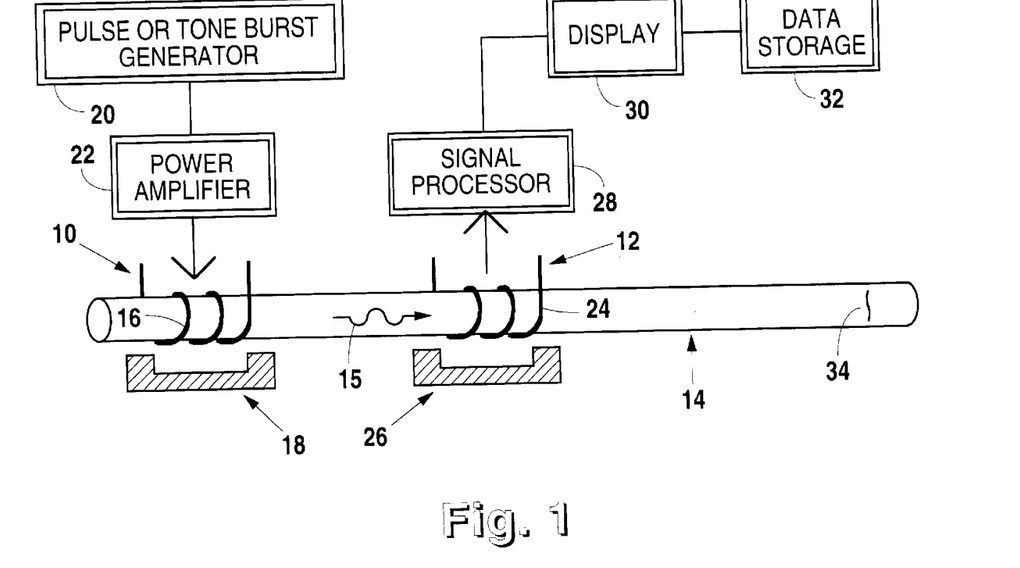
FIG. 1 is a schematic representation of an apparatus which implements the present invention to measure prestress loads applied to a cable.

Reference is first made to FIG. 1 for a detailed depiction of an apparatus which can be used to implement the method of the present invention, providing for measurement of tensile loading in ferromagnetic materials. In this embodiment of the present invention, both transmitting assembly (10) and receiving assembly (12) are required. The specific structures of the transmitting and receiving assemblies (10 and 12) are discussed in more detail below, and illustrated in FIGS. 2 and 3.

While no direct mechanical coupling to the material (14) under examination is required, the magnetostrictive sensor apparatus must be positioned proximate to the ferromagnetic steel cable, rope, etc., in which tensile loading is to be measured. Transmitting and receiving assemblies (10 and 12) are each operable at a distance of several centimeters from the material (14). Transmitting assembly (10) is comprised primarily of transmitting coil (16) and bias magnet (18). A pulse, tone-burst, or sinusoidal wave generator (20) is coupled through power amplifier (22) to transmitting coil (16) and generates a signal appropriate to produce a mechanical wave (15) within material (14) under measurement.

Receiving assembly (12) of the apparatus of the present invention is configured much like transmitting assembly (10) and is comprised primarily of receiving coil (24), also encircling or positioned adjacent to material (14) under evaluation, as well as bias magnet (26). The signals received by receiving coil (24) are processed by signal processor (28) and may be displayed directly on display (30) or stored for later review and analysis in data storage device (32).

Figure 2:
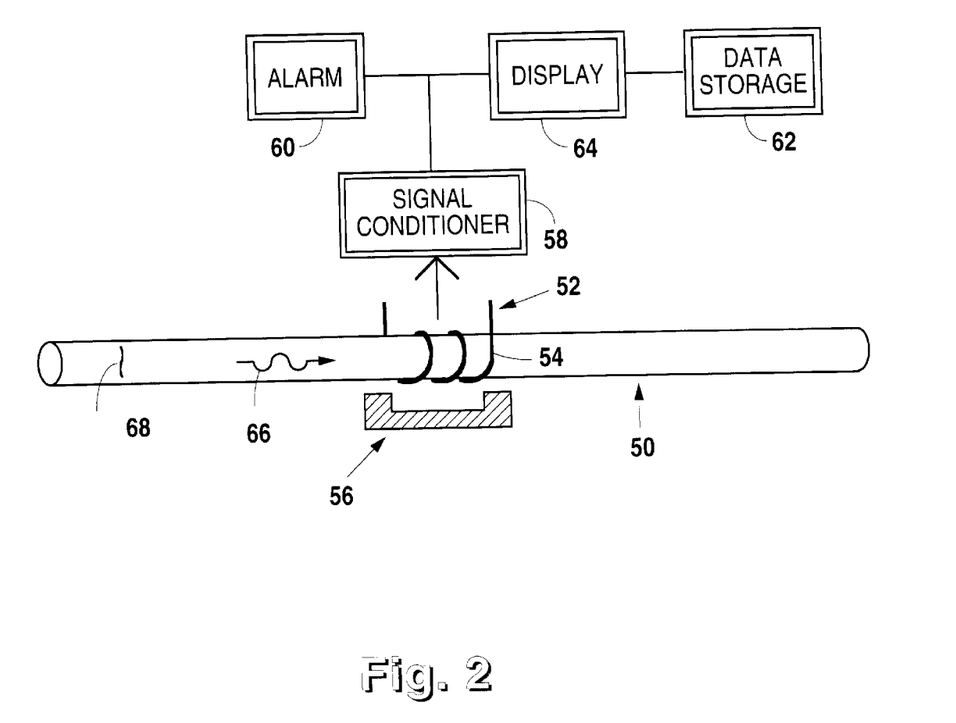
FIG. 2 is a detailed view of a magnetic coil and bias magnet assembly appropriate for locally detecting the magnetostrictive effect caused by mechanical waves within a ferromagnetic rope cable.
Figure 3:
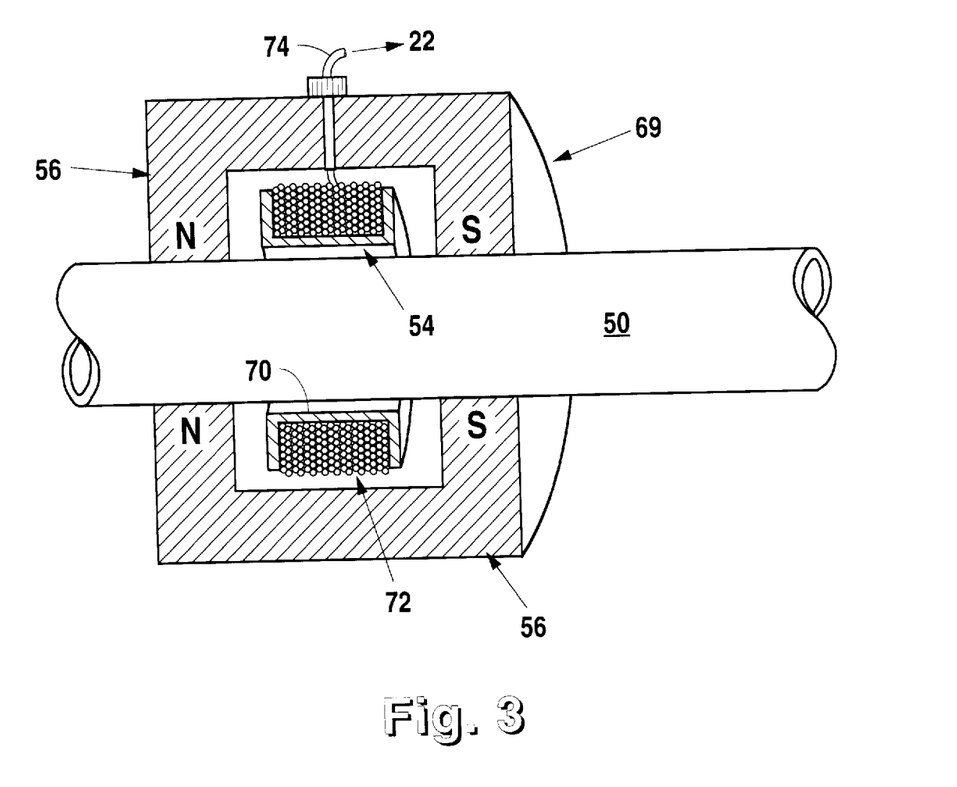
FIG. 3 is a detailed view of a second type of magnetic coil and bias magnet assembly appropriate for transmitting and globally detecting mechanical waves in ferromagnetic cable stays, strands, or suspension ropes.

The bias magnetic field necessary to sustain the magnetostrictive effect can be produced by a permanent magnet, as depicted in FIGS. 2 and 3, or by using an electromagnet. Bias magnets (18 and 26) may not be required in every instance, however, if sufficient residual magnetization is produced in the material (14) to sustain the magnetostrictive effect. Such magnetization can be effected by imposing a magnetic field within material (14) of sufficient strength to permanently align the magnetic domains, as is well known in the art. The greater the bias field magnitude, the greater will be the magnetostrictive conversion efficiency (i.e. from electrical to mechanical energy, and vice-versa), up to a certain level. When the bias field exceeds this optimum level, the conversion efficiency decreases.

One benefit of the present invention is that the installation of assemblies (10 and 12) requires no physical, electrical, or acoustic coupling to the material (14) under evaluation. Transmitting assembly (10) and receiving assembly (12) may be located proximate to each other (e.g. within a few feet) as is shown in FIG. 1, or they may located at some distance from each other (e.g. hundreds of feet apart), as long as their spatial relationship is known. As a practical matter, the assemblies (10 and 12) will usually be located within a few feet of each other, since tensile loading is normally constant along the entire length of material (14).

Use of the magnetostrictive effect involves creating a variation in the magnetic field in material (14). Pulse or tone-burst generator (20), by way of power amplifier (22), supplies a voltage to transmitting coil (16) that abruptly changes the magnetic field created by bias magnet (18) in proximity to material (14). This abrupt change in the magnetic field induces, because of the magnetostrictive effect, a mechanical wave (15) within material (14) that emanates from the area adjacent to transmitting coil (16). This mechanical wave (15) travels along the material (14) in both directions (in FIG. 1, only one direction of travel is shown). Wave (15), as indicated in FIG. 1, travels down the material and passes through receiving coil (24), where the modifications and changes effected in wave (15) by the loading conditions imposed upon material (14) are detected. Tensile loading applied to the material (14) has the effect of dramatically reducing the frequency content of the wave (15) (with respect to an unloaded material) over a relatively narrow bandwidth. The details of establishing signal patterns to determine tensile loading is described in more detail below with respect to FIGS. 4a, 4b, 5a, 5b, 6a, 6b, 7a, 7b, and 8.

Mechanical wave (15) passing through material (14) proximate to receiving coil (24) creates a dilation/contraction in the ferromagnetic material which in turn alters the magnetic field within and about material (14). Bias magnet (26) establishes a baseline magnetic field that fluctuates as a result of the magnetostrictive effect in response to the passage of an mechanical wave therethrough. A current/voltage is induced in receiving coil (24) as a result of this fluctuating magnetic field according to well known principles. This current or voltage created in receiving coil (24) is conditioned by signal processor (28) in such a way as to amplify and filter the signal to a level and range of frequencies appropriate for load measurement. The signal is then digitized, and a FT, Fast-Fourier Transform (FFT), or Short-Time FT (STFT) is performed in the signal processor. This processed signal is then displayed on a Cathode-Ray Tube (CRT) or other such display (30) and may be recorded in data storage device (32) for later display and analysis in time domain. The notch frequency (found by observation of the transformed wave parameters) can then be determined, and the applied load calculated by using a known relationship between the notch frequency and the load. The specifics of determining the notch frequency, and analyzing the received signal, are discussed in more detail below. The instant invention also contemplates the addition of an alarm element (60) as an adjunct to monitoring tensile loading conditions in material (50) over a long period of time.

Reference is now made to FIG. 2 for a detailed depiction of the structure of a typical magnetostrictive sensor (69) as would be appropriate for attachment to a flat or curved ferromagnetic surface. FIG. 2 discloses both the positioning of permanent bias magnet (56) for establishing a baseline magnetic field within ferromagnetic material (50), and receiving coil (54) that are both placed in proximate position to ferromagnetic material (50). Coil (72), wound about bobbin (70), is connected by means of electrical cable (74) to signal processor (28) described previously. In this particular embodiment, permanent bias magnet (56) establishes the bias field within sample material (50) and also serves to attach sensor (69) to material (50).

Sensor (69) serves primarily as a receiving coil, although the same structural configuration of the sensor could also be utilized as a transmitting coil, in which case permanent bias magnet (56) would serve as a field biasing means for material (50), and electromagnetic "receiving" coil (54) would serve as a means for altering the bias magnetic field to induce, through the magnetostrictive effect, a mechanical wave within material (50).

Reference is now made to FIG. 3 for a detailed depiction of an alternative structural configuration of a magnetostrictive transducer which can be used to implement the present invention. In this embodiment, sensor (69) is cylindrical in nature and designed to encircle a cylindrical cable strand, rod, or rope (50). The functional structure of sensor (69) is essentially the same as that shown in FIG. 2, comprising a bias magnet (56), coil (72), and bobbin (70). In this case, electromagnetic receiving coil (54) is enclosed within cylindrical permanent bias magnet (56), and both elements surround the material (50) to be evaluated. In the preferred embodiment shown in FIG. 3, installation of sensor (69) for prestress load measurement purposes would involve placing sensor (69) in proper physical relation to the material (50) to be evaluated prior to completing emplacement of the material (50) within the loading structure (not shown). The instant invention also contemplates using sensors (69) to retrofit existing structures for prestress load measurement; the structural characteristics of sensor (69) enclosing material (50) can be modified to allow sensor placement to be accomplished without disturbing material (50). The use of "clamp on" sensors of this type are well known in the art.

Figure 4A:
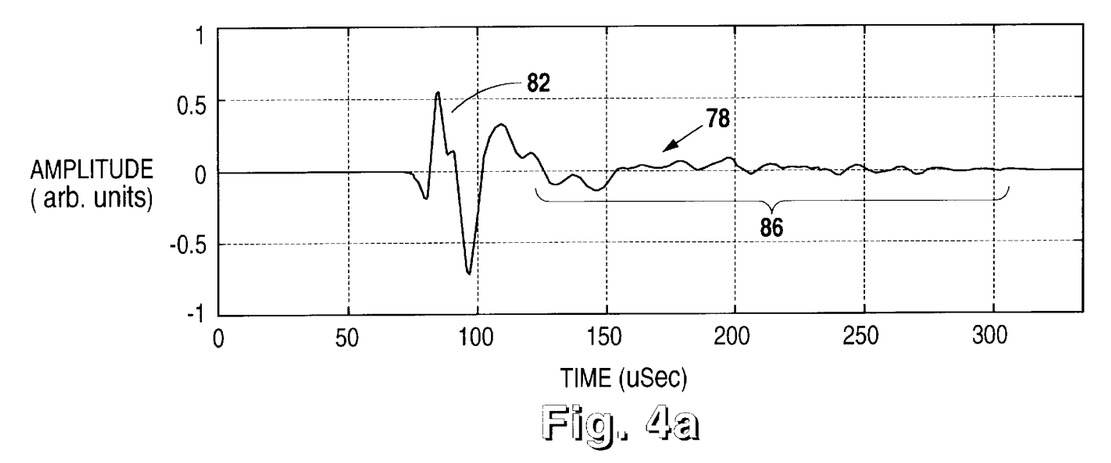
FIG. 4a is a graphic depiction of the signal obtained using the apparatus of the present invention on a prestressed cable, showing received signal amplitude versus time.

Reference is now made to FIG. 4a for a detailed description of a sample received signal (78) from the magnetostrictive method of the present invention. Wave propagation in the loaded material is dispersive, causing signal (78) to spread out over time.

Figure 4B:
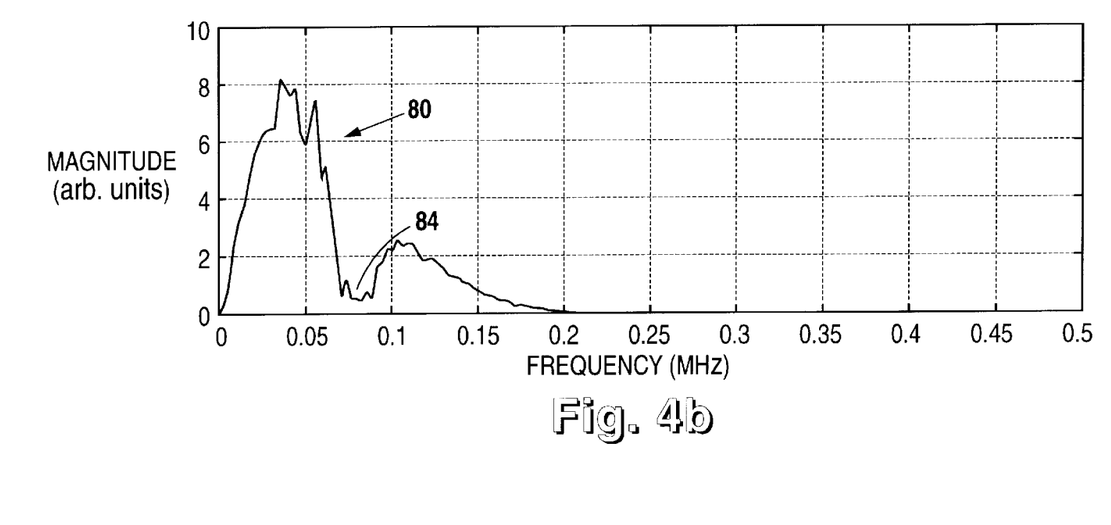
FIG. 4b is a graphic depiction of the signal obtained using the apparatus of the present invention on a prestressed cable after a Fourier Transformation (FT) has been performed, showing the magnitude of the received signal versus frequency, and the appearance of a signal notch.

The graphic representation shown in FIG. 4b depicts the magnitude of the Fourier Transform (80) of received signal (78). As can be seen in FIG. 4b, notch (84) indicates the dramatic reduction in amplitude over a narrow band of frequencies observed in received signal (78), due to loading of the strand under investigation. The received signal (78) in this case (as well as for FIGS. 5a, 6a, and 7a) is the result of experimentally observing the wave propagation properties in a 10 foot long, 0.5 inch diameter, 270 ksi, seven-wire strand. The applied load in the case of FIG. 4a was 2,000 lb.

The experimental investigation involved transmitting a short-duration elastic wave pulse (sufficiently sharp to ensure that the bandwidth encompassed included the notch frequency, as explained below) in the strand by placing a magnetostrictive sensor (MsS) at approximately 2.5 feet along the length of the strand, detecting propagating elastic waves by placing another MsS at approximately 5.0 feet along the length of the strand, and analyzing the detected signals using a frequency (i.e. FT or FFT), or time-frequency (STFT) transformation.

Figure 5A:
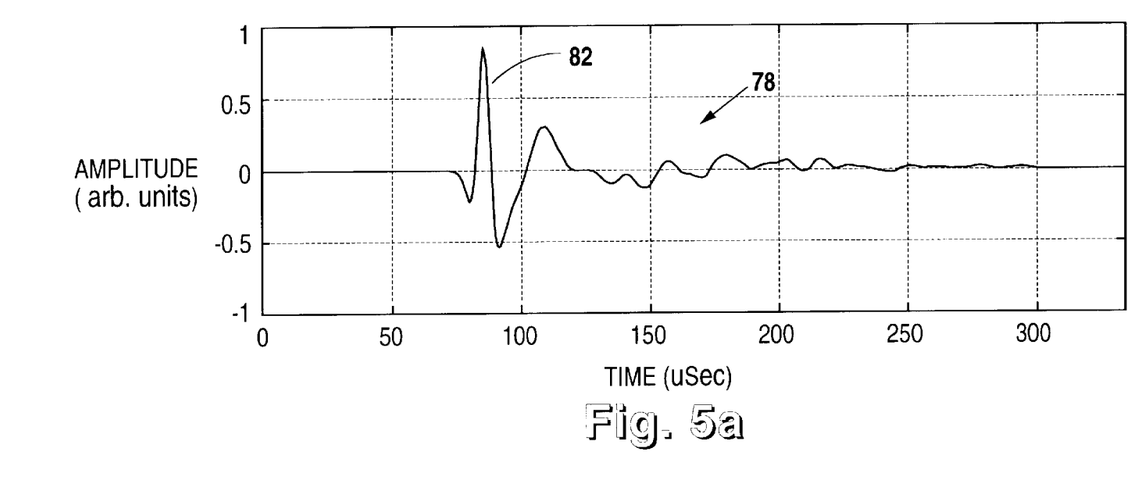
FIG. 5a is a graphic depiction of the signal obtained using the apparatus of the present invention on an unloaded cable, showing the received signal amplitude versus time.
Figure 5B:
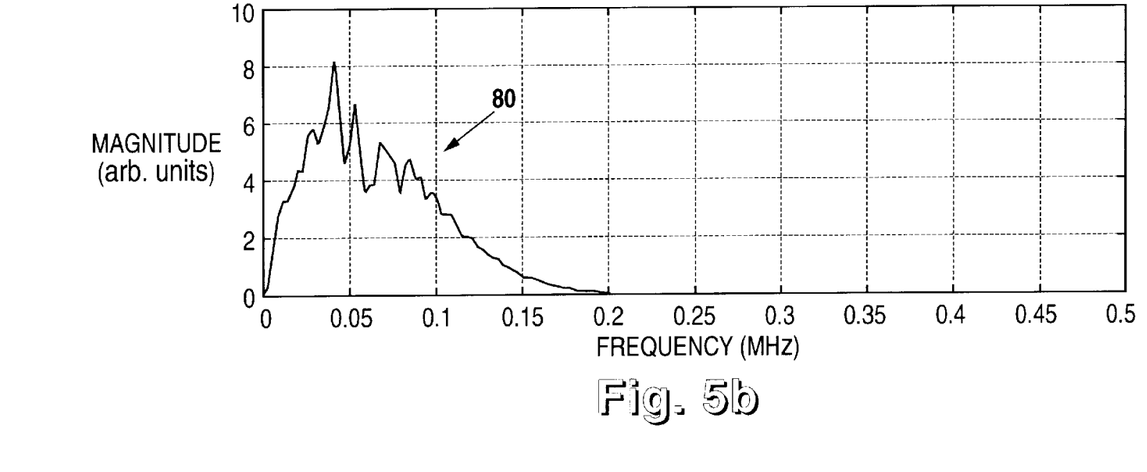
FIG. 5b is a spectral graphic depiction of the signal obtained using the apparatus of the present invention on an unloaded cable after a Fast-Fourier Transformation (FFT) has been performed, showing the frequency content of the received signal.
Figure 6A:
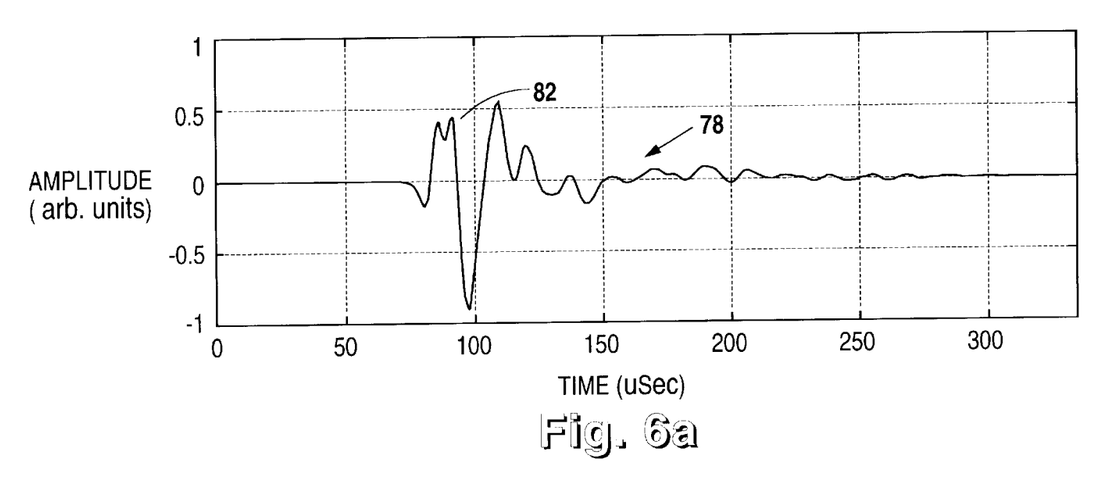
FIG. 6a is a graphic depiction of the signal obtained using the apparatus of the present invention on a cable prestressed to 4,000 lbs, showing the received signal amplitude versus time.
Figure 6B:
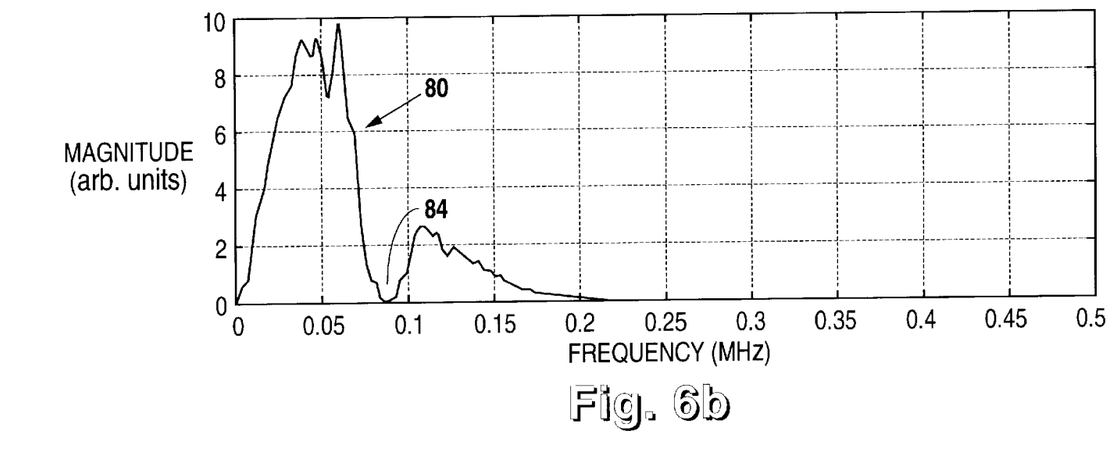
FIG. 6b is a spectral graphic depiction of the signal obtained using the apparatus of the present invention on a cable prestressed to 4,000 lbs after a FFT has been performed, showing the frequency content of the received signal, and the appearance of a signal notch.
Figure 7A:
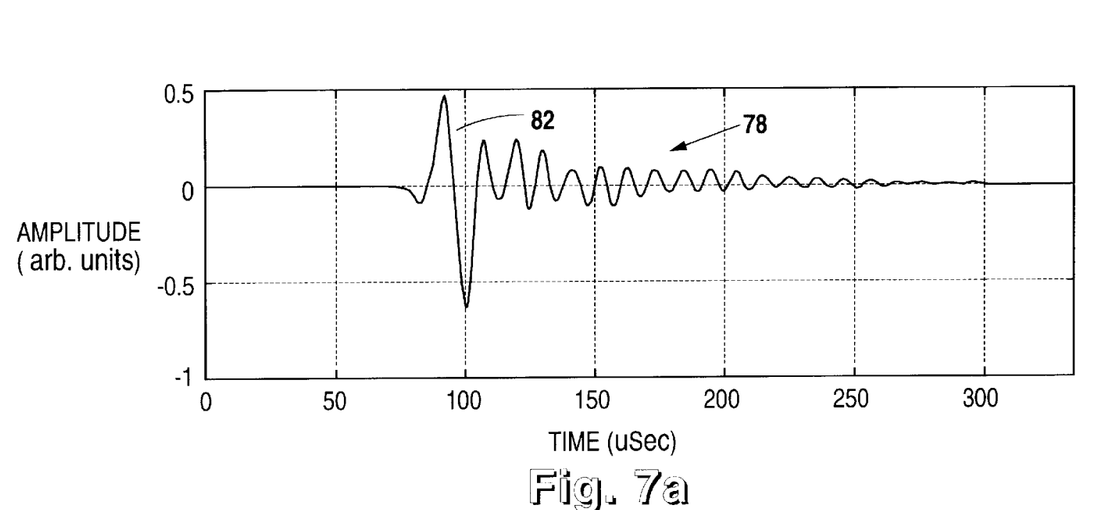
FIG. 7a is a graphic depiction of the signal obtained using the apparatus of the present invention on a cable prestressed to 32,000 lbs, showing the received signal amplitude versus time.
Figure 7B:
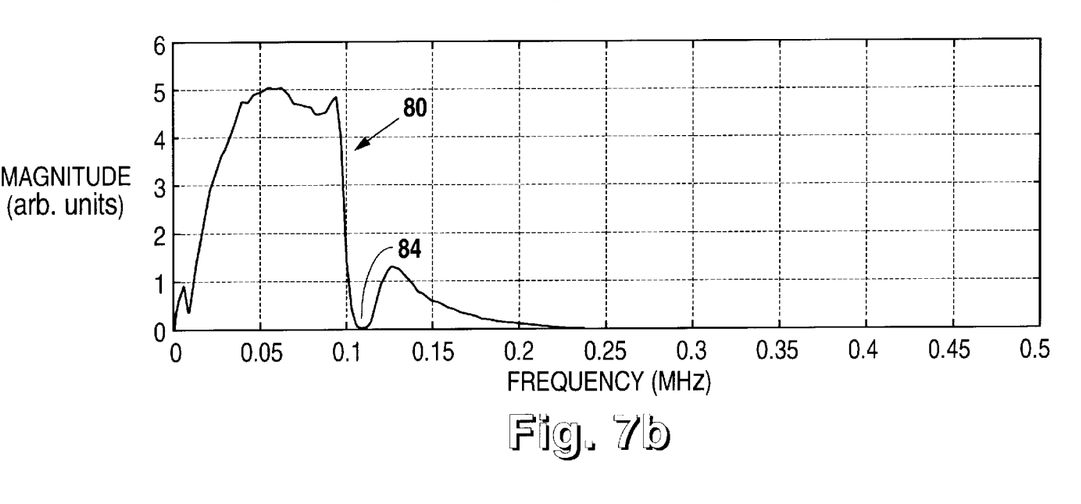
FIG. 7b is a spectral graphic depiction of the signal obtained using the apparatus of the present invention on a cable prestressed to 32,000 lbs after a FFT has been performed, showing the frequency content of the received signal, and the appearance of a signal notch.

After several observations of FFTs for received signals, it was noted that the magnetostrictive wave signals obtained under loaded conditions were consistently missing a portion of their frequency spectrum at notch (84). FIGS. 5b, 6b, and 7b show the FFT results obtained with the aforementioned strand under 0, 4,000 and 32,000 pounds of load, respectively. Each of FIGS. 5b, 6b, and 7b consist of a spectral analysis of received signal (78) (illustrated as amplitude versus time in FIGS. 5a, 6a, and 7a, respectively) over time. That is, received signal (78) is sampled over a frequency range of from 0 to 250 Mhz for a time of 1.5 milliseconds.

Figure 8:
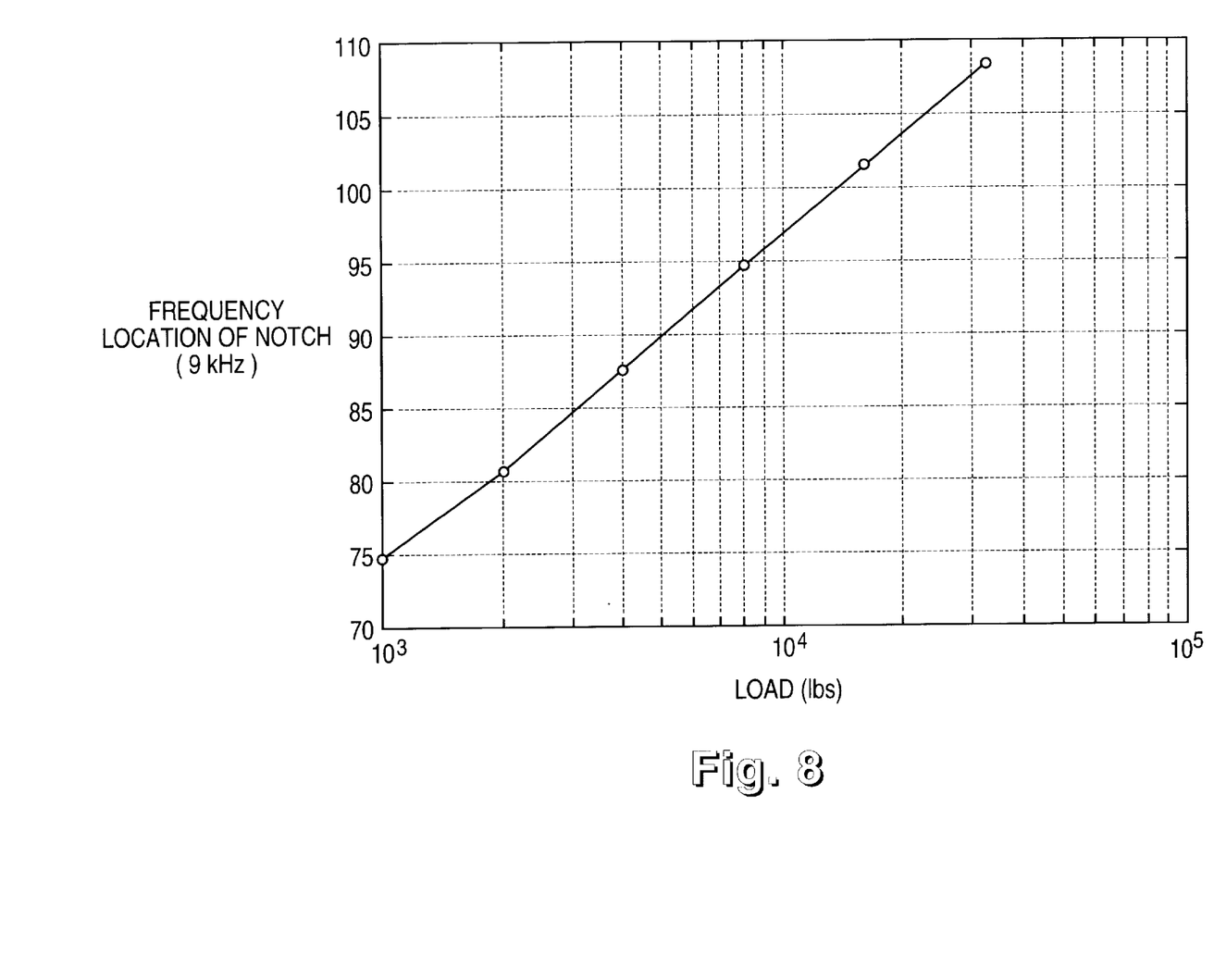
FIG. 8 is a graphic depiction of the logarithmic relationship between the notch frequency and the prestress load at various stress loading levels.

At zero applied load, no frequency portion was missing in the spectrum (i.e. no notch was present), as shown in FIG. 5b. However, as can be seen in FIGS. 6b and 7b, the notch frequency (84) appears as a visual void when a load is applied, and occurs at progressively higher frequencies as the amount of applied load is increased. It has been experimentally determined that the notch frequency is linearly proportional to the log of the applied force, as shown in FIG. 8. The underlying physical mechanism responsible for the observed phenomenon is not precisely known. However, since the properties of wave propagation in a wire are dependent on wire geometry, it is expected that strands of different diameters and configurations will exhibit somewhat different relationships, which can also be experimentally determined.

Using the disclosed method and apparatus, it is possible to characterize a "signature" for a material loading to be evaluated associated perhaps with its installation and geometry, and thereafter to reevaluate the material and obtain a new signature at some time after degradation and fractures might be expected to have occurred. A monthly or annual examination of a structure, for example, might produce a number of signal waveforms that can be compared one to the other, with their similarities characterized as initial pulses, end reflected signals, points of external contact, etc., and the distinctive areas of difference between the signal signatures being indicative of changes in tensile loading in the material.

The invented method relies upon the aforementioned relationship between the notch frequency and the applied load, as depicted in FIG. 8, for measuring the prestressing force (or load) in a strand. This relationship is accurate for strands in air. The relationship may not hold for strands embedded in concrete because such wave propagation properties are greatly altered by the physical contact between the strand and the concrete. If a determinable relationship does not hold for strands embedded in concrete, a local excavation of the concrete (to expose a short length of the strand to be measured) may be necessary to apply the invented method.

Figure 9:
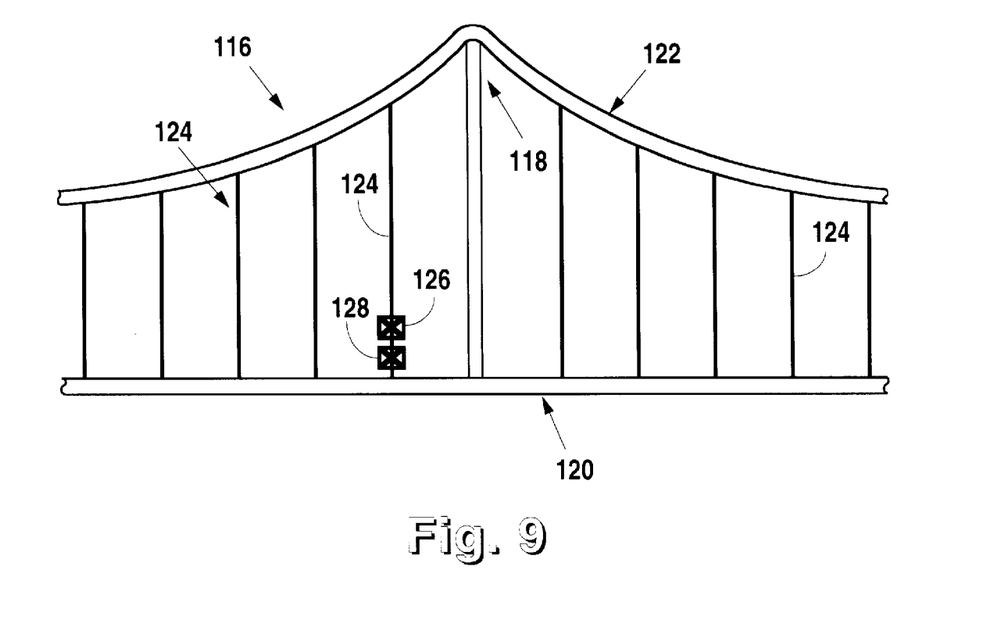
FIG. 9 is a schematic representation of implementing the apparatus of the present invention for magnetostrictive measurement of suspension bridge cable tensile loading.

Reference is now made to FIG. 9 for a schematic representation of one method of installing a first embodiment of the present invention on suspension bridge cables. In this application of the magnetostrictive tensile loading measurement method, main cables (122) on bridge (116) are used to support suspender ropes (124) that themselves extend between main cable (122) and deck (120) of bridge (116). Progressive testing of each of the individual suspender ropes (124) can be made, each time obtaining a signature for the rope that can be immediately analyzed or compared with later signatures acquired over time.

Tensile loading in various elements of a structure can change over time for many reasons, including failure of individual elements. It is possible to use the method and apparatus of the present invention to assist in the analysis, prediction, and/or detection of various structural changes indirectly, by monitoring tensile loading of structural elements over time. While the causal agent of accelerated or radical changes in tensile loading may not be revealed by the present invention, it may be very useful in the investigation of structural anomalies simply to know that such changes have in fact occurred, including their magnitude and relationship in time.

Figure 10:
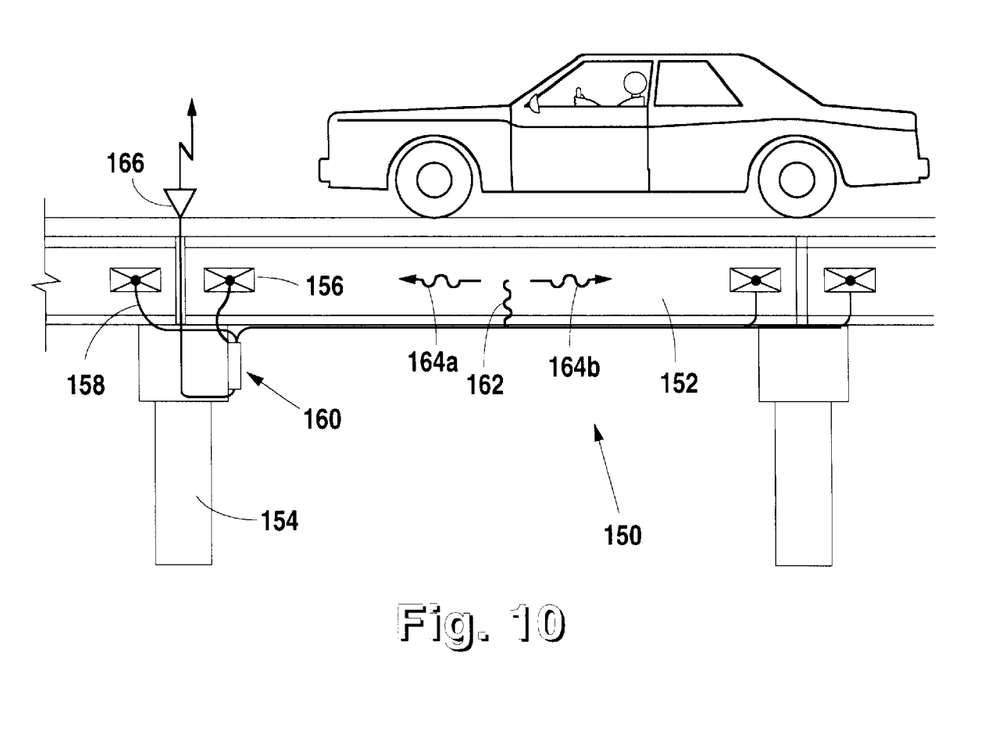
FIG. 10 is a schematic representation of implementing the apparatus of the present invention for magnetostrictive measurement and monitoring of highway bridge steel girder tensile loading.

Reference is now made to FIG. 10 for a detailed description of an application of the present invention wherein ordinary prestressed bridge tension structures might be analyzed and/or monitored as tensile loading within various elements changes. A magnetostrictive tensile load monitoring system is set up such that over a long term period of time, fractures (162) and other anomalies which cause stretching of the prestressed element (152), disbonds between the prestressed element (152) and the concrete structure (154), or concrete creep (i.e. where concrete deforms over time due to mechanical strain) on bridge (150) can be detected. Receiving coil (156) can be located near one end of prestressed element (152) in bridge (150), and transmitting coil (158) can be located near the other end of prestressed element (152). As a practical matter, the receiving coil (156) and the transmitting coil (158) will most likely be located within a few feet of each other, since changes in the tensile loading of element (152) can be recorded along its entire length. Receiving coil (156) translates mechanical wave (164) produced by the activity of transmitting coil (158) and carried within element (152) into a signal indicative of the fluctuating magnetic field resulting from the magnetostrictive effect. The signal generated by receiving coil (156) is then carried to the appropriate electronics (160) to record the signal information and associate it with a particular time, and/or trigger alarm (166).

Alarm (166) associated with bridge (150) can take the form of a radio transmitter alerting a central office of problems with bridge (150); possibly activating a simple flashing light that to alert a periodic inspector of problems. In the alternative, electronics (160) of the system can simply record the signals detected by receiving coil (156) in a manner amenable to periodic retrieval and analysis. The electronics for such a structure could be centralized in a single unit (as with 160) with each sensor being individually identified by centralized unit (160) in a manner well known in the field.

The disclosed invention generally involves the use of two magnetostrictive sensors (i.e. a separate "transmitter" and "receiver"). However, a single sensor can also be used to effect measurement of tensile loading under certain conditions. In this case, a single magnetostrictive sensor is applied to a ferromagnetic cable (or other ferromagnetic structural component:) in close proximity to the cable end, excited as a transmitting element, and then electronically "switched" to act as a magnetostrictive receiving element. The mechanical wave excited by the sensor/transmitter travels to the cable endpoint and is reflected along the cable for reception by the sensor/receiver. The resulting electric signal is thereafter amplified, digitized, and analyzed in the frequency domain. The notch frequency found by observation of the transformed wave parameters can then be determined as discussed previously, and the applied load can be calculated.

While a number of applications of each of the preferred embodiments of the present invention have been identified, it is anticipated that one skilled in the art would identify further applications of each of these methods and each apparatus described, in a manner consistent with the procedures associated with the present invention. It is anticipated that the present invention can be applied in any environment where remote nondestructive measurement of prestress ferromagnetic material loading is required.

We claim:

1. A method for the nondestructive measurement of tensile loading in a ferromagnetic material comprising the steps of:

establishing a first DC bias magnetic field in a first localized area of said ferromagnetic material;

causing a fluctuation in said first magnetic field;

generating a primary mechanical wave within said ferromagnetic material as a result of a magnetostrictive effect from said fluctuation in said first magnetic field;

establishing a second DC bias magnetic field in a second localized area of said ferromagnetic material;

detecting changes in said second magnetic field as a result of a passage of said primary mechanical wave through said second localized area, said changes in said second magnetic field caused by an inverse magnetostrictive effect; and correlating said detected changes in said second magnetic field with patterns of changes known to be indicative of an amount of tensile loading applied to said ferromagnetic material.

2. The method of claim 1 wherein said step of establishing a first DC bias magnetic field comprises placing a permanent or electromagnetic bias magnet proximate to said first localized area of said ferromagnetic material.

3. The method of claim 1 wherein said step of causing a fluctuation in said first magnetic field comprises placing an electromagnetic coil proximate to said first localized area of said ferromagnetic material, and varying a current through said electromagnetic coil.

4. The method of claim 1 wherein said step of establishing a second DC bias magnetic field comprises placing a permanent or electromagnetic bias magnet proximate to said second localized area of said ferromagnetic material.

5. The method of claim 1 wherein said step of detecting changes in said second magnetic field comprises placing an electromagnetic coil proximate to said second localized area of said ferromagnetic material, and detecting variations in a voltage induced in said electromagnetic coil.

6. The method of claim 1 wherein said step of establishing a first DC bias magnetic field comprises establishing a residual magnetic field within said ferromagnetic material at said first localized area.

7. The method of claim 1 wherein said step of establishing a second DC bias magnetic field comprises establishing a residual magnetic field within said ferromagnetic material at said second localized area.

8. The method of claim 1 wherein said patterns of changes are determined through a frequency transformation of said detected changes in said second magnetic field.

9. A method for the nondestructive measurement of tensile loading in a ferromagnetic material comprising the steps of:

establishing a DC bias magnetic field in a localized area of said ferromagnetic material;

causing a fluctuation in said magnetic field;

generating a primary mechanical wave within said ferromagnetic material as a result of a magnetostrictive effect from said fluctuation in said magnetic field;

detecting changes in said magnetic field as a result of a passage of said primary mechanical wave through said localized area, said changes in said magnetic field caused by an inverse magnetostrictive effect; and correlating said detected changes in said magnetic field with patterns of changes known to be indicative of an amount of tensile loading applied to said ferromagnetic material.

10. The method of claim 9 wherein said step of establishing a DC bias magnetic field comprises placing a single permanent or electromagnetic bias magnet proximate to said localized area of said ferromagnetic material.

11. The method of claim 9 wherein said step of causing a fluctuation in said magnetic field comprises placing an electromagnetic coil proximate to said localized area of said ferromagnetic material, and varying a current through said electromagnetic coil, and wherein said step of detecting changes in said magnetic field comprises detecting variations in a voltage induced in said electromagnetic coil.

12. An apparatus for the nondestructive measurement of tensile loading in a ferromagnetic material comprising:

a transmitting coil positioned adjacent to a first localized area of said ferromagnetic material;

a first DC bias magnet adjacent to said transmitting coil, said first DC bias magnet creating a first DC magnetic field within and around said first localized area of said ferromagnetic material;

a signal generation source capable of supplying said first transmitting coil with a current sufficient to create fluctuations in said first DC bias magnetic field;

a receiving coil positioned adjacent to a second localized area of said ferromagnetic material;

a second DC bias magnet adjacent to said receiving coil, said second DC bias magnet creating a second DC magnetic field within and around said second localized area of said ferromagnetic material;

a signal processor for amplifying and filtering a voltage from said receiving coil, said amplified and filtered voltage being a signal indicative of fluctuations in said second DC magnetic field; and display means for displaying said signal and for allowing a test operator to interpret said signal and thereby interpret said fluctuations in said second DC magnetic field;

wherein said fluctuations in said first DC magnetic field generate a primary mechanical wave within said material due to a magnetostrictive effect, and said fluctuations in said second DC magnetic field are caused by an inverse magnetostrictive effect due to the passage of said primary mechanical wave through said second localized area; and wherein said interpretation of said signal includes identifying an amount of tensile loading which exists within said material.

13. The apparatus of claim 12 further comprising recording means capable of receiving and storing said signal for subsequent display and interpretation.

14. The apparatus of claim 12 wherein said signal is the result of a frequency transformation which has been applied to said amplified and filtered voltage.

15. An apparatus for the nondestructive measurement of tensile loading in a ferromagnetic material comprising:

a transceiving coil positioned adjacent to a localized area of said ferromagnetic material;

a DC bias magnet adjacent to said transceiving coil, said DC bias magnet creating a DC magnetic field within and around said localized area of said ferromagnetic material;

a signal generation source capable of supplying said transceiving coil with a current sufficient to create fluctuations in said DC bias magnetic field;

a signal processor for amplifying and filtering a voltage from said transceiving coil, said amplified and filtered voltage being a signal indicative of fluctuations in said DC magnetic field; and display means for displaying said signal and for allowing a test operator to interpret said signal and thereby interpret said fluctuations in said DC magnetic field;

wherein said fluctuations in said DC magnetic field generate a primary mechanical wave within said material due to a magnetostrictive effect, and said fluctuations in said DC magnetic field are caused by an inverse magnetostrictive effect due to the passage of said primary mechanical wave through said localized area; and wherein said interpretation of said signal includes identifying an amount of tensile loading which exists within said material.

* * * * *

UNITED STATES PATENT AND TRADEMARK OFFICE
CERTIFICATE OF CORRECTION

PATENT NO. : 5,821,430
DATED : October 13, 1998
INVENTOR(S) : Kwun, et al.

It is certified that error appears in the above-identified patent and that said Letters Patent is hereby corrected as shown below:

In the bibliographic data:

[*] Notice: The term of this patent shall not extend beyond the expiration date of Pat. No. 5,456,113 should be inserted.

In the Drawings:

Fig. 8 (sheet 7 of 8)
The vertical axis units should read (kHz)

Signed and Sealed this

Eighth Day of June, 1999

Attest:

Q. TODD DICKINSON

*Attesting Officer*      *Acting Commissioner of Patents and Trademarks*